US012734096B2

(12) United States Patent
Dijkstra

(10) Patent No.: US 12,734,096 B2
(45) Date of Patent: Sep. 15, 2026

(54) HANDHELD DEVICE FOR PROVIDING FLUIDIC MASSAGE

(71) Applicant: SHENZHEN KAIYAN MEDICAL EQUIPMENT CO., LTD, Shenzhen (CN)

(72) Inventor: Alain Dijkstra, Amstelveen (NL)

(73) Assignee: Shenzhen Kaiyan Medical Equipment Co. Ltd, Shenzhen (CN)

( * ) Notice: Subject to any disclaimer, the term of this patent is extended or adjusted under 35 U.S.C. 154(b) by 528 days.

(21) Appl. No.: 18/047,291

(22) Filed: Oct. 18, 2022

(65) Prior Publication Data

US 2024/0091095 A1 Mar. 21, 2024

(51) Int. Cl.
*A61H 9/00* (2006.01)

(52) U.S. Cl.
CPC ... *A61H 9/0021* (2013.01); *A61H 2009/0042* (2013.01); *A61H 2201/0153* (2013.01); *A61H 2201/0188* (2013.01); *A61H 2201/1654* (2013.01); *A61H 2201/5005* (2013.01)

(58) Field of Classification Search
CPC .......... A61H 9/0021; A61H 2009/0042; A61H 2201/0153; A61H 2201/0188; A61H 2201/1654; A61H 2201/5005; A61H 9/0057
See application file for complete search history.

(56) References Cited

U.S. PATENT DOCUMENTS

| | | | | | |
|---|---|---|---|---|---|
| 819,450 | A * | 5/1906 | Richwood | A61H 9/0078 | 601/150 |
| 4,079,891 | A * | 3/1978 | Kwan | B05B 1/1645 | 239/381 |
| 8,074,838 | B1 | 12/2011 | Tate | | |
| 8,881,993 | B2 * | 11/2014 | Lev | B05B 1/1636 | 239/394 |
| 9,713,775 | B2 | 7/2017 | Cogliandro | | |
| 2005/0209539 | A1 * | 9/2005 | Lev | A61H 9/0071 | 601/55 |
| 2006/0041210 | A1 * | 2/2006 | Regey | A61H 19/44 | 600/38 |
| 2009/0275796 | A1 * | 11/2009 | Gil | A61H 19/44 | 600/38 |

(Continued)

FOREIGN PATENT DOCUMENTS

WO WO-2006033114 A2 * 3/2006 ........... A61H 9/0078

*Primary Examiner* — Timothy A Stanis
*Assistant Examiner* — Matthew R Moon
(74) *Attorney, Agent, or Firm* — Willie Jacques; Emanus LLC

(57) ABSTRACT

A handheld device for providing fluidic massage comprises a storage container adapted to store a fluid, one or more fluidic channels extending into the storage container, the one or more fluidic channels including one or more respective first ends and one or more respective second ends, wherein the one or more first ends are within the storage container, one or more pumps in fluidic communication with the storage container through the one or more fluidic channels, one or more nozzles provided at the one or more second ends of the fluidic channels, and a bladder encapsulating the one or more nozzles, wherein the bladder is adapted to be in contact with a user at an outer surface of the bladder, and receive fluid flow from the one or more nozzles, at an inner surface of the bladder.

15 Claims, 8 Drawing Sheets

(56) References Cited

U.S. PATENT DOCUMENTS

| | | | | |
|---|---|---|---|---|
| 2011/0079316 | A1 * | 4/2011 | Ramere | A63H 27/10 141/10 |
| 2023/0255774 | A1 * | 8/2023 | Moore | A61H 19/44 600/40 |

* cited by examiner

HANDHELD DEVICE FOR PROVIDING FLUIDIC MASSAGE

TECHNICAL FIELD

The present invention generally relates to therapeutic devices. More specifically the present invention relates to non-invasive therapeutic devices which may also be used for recreational purposes.

BACKGROUND ART

Many people suffer from joint pain, muscle aches, and inflammation. Muscle aches are also known as myalgia and can be felt in any area of the body with muscles. Depending on the cause, the discomfort may be mild or extremely severe. Muscle aches can occur in adults and children. Body pains associated with muscles affect individuals' day-to-day activities and cause problems during movement. People with joint pain, inflammation, and damage to weight-bearing joints (i.e., hips, knees, ankles, feet, shoulders) caused by arthritis have mobility issues that affect their ability to work and perform common daily tasks. It can cause an inability to enjoy leisure activities, strained relationships, and problems at work.

Various devices have been known in the prior art that are used for body massages, exercise recovery massages, facial massages, and skin treatments for alleviating the pain of muscles and enhancing the skin condition. However, these devices are available in various shapes and sizes for different body parts are having significant structural and functional shortcomings. Presently, most of the known massage devices are provided with a motor connected to the massage head and a power source. These types of devices use mechanical energy to provide massage therapy by rotating the massage head in a circular motion or by moving the massage head in a linear motion. Such techniques can be quite uncomfortable and painful for the user as they can cause physical harm due to the nature of therapy and also it can create muscle spasms if not properly handled. Some devices provide water massage therapy like a water massage bed. The structural shortcoming of these devices is that either they are available in huge sizes, or they are available for a specific body part. For example, water massage beds are used for whole-body massage, but these are neither convenient nor cost-effective.

Therefore, there is a need for a handheld massage device that overcomes the disadvantages and limitations associated with the prior art and provides a more satisfactory solution.

Objects of the Invention

Some of the objects of the invention are as follows:

An object of the invention is to provide a handheld device that allows fluidic massage to a user on an affected part of the body;

Another object of the invention is that the handheld device be portable and ergonomically easy to use;

Yet another object of the invention is that the handheld device be adjustable and reconfigurable for varying portions of the body of the user and varying needs for the intensity of the fluidic massage; and Yet another object of the invention is that the handheld device be non-invasive and ergonomically relatable for the user.

SUMMARY OF THE INVENTION

According to a first aspect of the present invention, there is provided a handheld device for providing fluidic massage, the handheld device comprising a storage container adapted to store a fluid, one or more fluidic channels extending into the storage container, the one or more fluidic channels including one or more respective first ends and one or more respective second ends, wherein the one or more first ends are within the storage container, one or more pumps in fluidic communication with the storage container through the one or more fluidic channels, one or more nozzles provided at the one or more second ends of the fluidic channels, and a bladder encapsulating the one or more nozzles, wherein the bladder is adapted to be in contact with a user at an outer surface of the bladder, and receive fluid flow from the one or more nozzles, at an inner surface of the bladder.

In one embodiment of the invention, the handheld device further comprises a nozzle cap configured to modify flow characteristics of the fluid flow from the one or more nozzles.

In one embodiment of the invention, the nozzle cap includes one or more through holes of varying cross-sections.

In one embodiment of the invention, the nozzle cap is configured to be adjusted manually.

In one embodiment of the invention, the nozzle cap is configured to be controlled electronically.

In one embodiment of the invention, at least one of the one or more fluidic channels is a supply channel and at least one of the one or more fluidic channels is a suction channel.

In one embodiment of the invention, at least one of the one or more pumps is a supply pump and at least one of the one or more pumps is a suction pump.

In one embodiment of the invention, the handheld device further comprises a radiation plate within the space encapsulated by the bladder, the radiation plate including one or more radiation sources for emitting electromagnetic radiation.

In one embodiment of the invention, the one or more radiation sources includes one or more light emitting diodes.

In one embodiment of the invention, the handheld device further comprises a main control unit adapted to modify flow characteristics of the fluid flow from the one or more nozzles.

In one embodiment of the invention, the main control unit is configured to modify the flow characteristics through electronic adjustment of a nozzle cap.

In one embodiment of the invention, the main control unit is configured to modify the flow characteristics through electronic control of the one or more pumps.

In one embodiment of the invention, the bladder is made of one or more of a flexible polymer material and a fabric material.

In one embodiment of the invention, the flexible polymer material is selected from a group consisting of Polyvinyl Chloride (PVC), Silicone and Latex.

In the context of the specification, the term "processor" refers to one or more of microprocessors, a microcontroller, a general-purpose processor, a Field Programmable Gate Array (FPGA) or an Application Specific Integrated Circuit (ASIC), and the like.

In the context of the specification, the phrase "storage memory" refers to one or more of a volatile storage memory, such as Static Random Access Memory (SRAM) and Dynamic Random Access Memory (DRAM) of types such as Asynchronous DRAM, Synchronous DRAM, Double Data Rate SDRAM, Rambus DRAM, and Cache DRAM, etc., or a non-volatile storage memory such as EPROM, EEPROM or flash memory or the like.

In the context of this specification, terms like "light", "radiation", "irradiation", "emission" and "illumination", etc. refer to electromagnetic radiation in frequency ranges varying from the Ultraviolet (UV) frequencies to Infrared (IR) frequencies and wavelength, wherein the range is inclusive of UV and IR frequencies and wavelengths. It is to be noted here that UV radiation can be categorized in several manners depending on respective wavelength ranges, all of which are envisaged to be under the scope of this invention. For example, UV radiation can be categorized as, Hydrogen Lyman-α (122-121 nm), Far UV (200-122 nm), Middle UV (300-200 nm), Near UV (400-300 nm). The UV radiation may also be categorized as UVA (400-315 nm), UVB (315-280 nm), and UVC (280-100 nm) Similarly, IR radiation may also be categorized into several categories according to respective wavelength ranges which are again envisaged to be within the scope of this invention. A commonly used subdivision scheme for IR radiation includes Near IR (0.75-1.4 μm), Short-Wavelength IR (1.4-3 μm), Mid-Wavelength IR (3-8 μm), Long-Wavelength IR (8-15 μm) and Far IR (15-1000 μm).

In the context of the specification, a "polymer" is a material made up of long chains of organic molecules (having eight or more organic molecules) including, but not limited to, carbon, nitrogen, oxygen, and hydrogen as their constituent elements. The term polymer is envisaged to include both naturally occurring polymers such as wool, and synthetic polymers such as polyethylene and nylon.

BRIEF DESCRIPTION OF THE ACCOMPANYING DRAWINGS

The accompanying drawings illustrate the best mode for carrying out the invention as presently contemplated and set forth hereinafter. The present invention may be more clearly understood from a consideration of the following detailed description of the preferred embodiments taken in conjunction with the accompanying drawings wherein like reference letters and numerals indicate the corresponding parts in various figures in the accompanying drawings, and in which.

DETAILED DESCRIPTION

Embodiments of the present invention disclosure will be described more fully hereinafter with reference to the accompanying drawings in which like numerals represent like elements throughout the figures, and in which example embodiments are shown.

The detailed description and the accompanying drawings illustrate the specific exemplary embodiments by which the disclosure may be practiced. These embodiments are described in detail to enable those skilled in the art to practice the invention illustrated in the disclosure. It is to be understood that other embodiments may be utilized, and other changes may be made, without departing from the spirit or scope of the present disclosure. The following detailed description is therefore not to be taken in a limiting sense, and the scope of the present invention disclosure is defined by the appended claims. Embodiments of the claims may, however, be embodied in many different forms and should not be construed as limited to the embodiments set forth herein.

It is envisaged that a handheld device that is ergonomically usable, for example in the shape of a massage gun, be provided that delivers fluidic massage to several body portions of a user. The handheld device is envisaged to include a storage container and fluid channels that deliver the fluid to and from the storage container. The fluid supply and return are envisaged to be aided through one or more fluid pumps. Nozzles are to be attached to the fluidic channels that would impinge the fluid in several fluid patterns on an inner surface of a bladder encapsulating the nozzles. While the outer surface of the bladder is envisaged to be in contact with the body of the user, to ensure that the fluid does not come in direct contact with the body of the user.

Flow characteristics of the fluid flow may be altered to provide fluidic massages for varying body portions and varying intensities by manual or electronic control of the pumps and/or by varying cross-sections and patterns of the fluid from the nozzles. Additional adjustments are also envisaged to be provided following user inputs received through push buttons or touch interfaces. It is further envisaged that the fluid may be water, a solution with organic or inorganic solvent, an emulsion or essential oils, or the like. Referring to the figures, the invention will now be described in further detail.

Figure 1A:
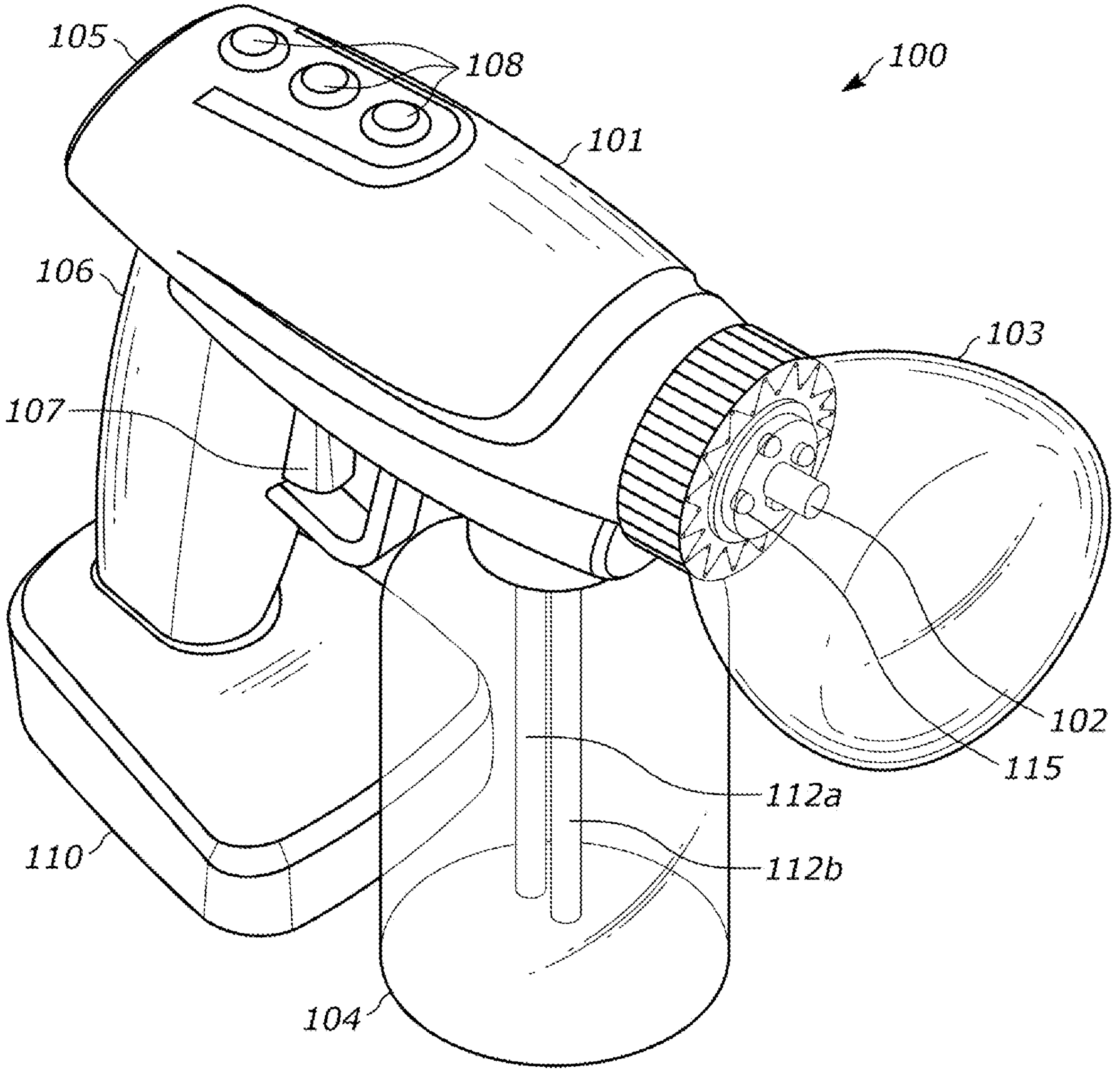
FIG. 1A illustrates a perspective view of a handheld device for providing fluidic massage, according to an embodiment of the present invention.

FIG. 1A illustrates a perspective view of a handheld device 100 (hereinafter referred to as "the device") for providing fluidic massage, according to an embodiment of the present invention. The device 100 includes a housing 101 for encapsulating several different elements of the device 100. The housing 101 may be made from metal, plastic material or composite materials, etc. The housing 101 allows the device 100 to be structured as a massage gun providing relatable ergonomics to the user. The device 100 further includes a nozzle 102 configured to impinge fluid flow on an inner surface of a bladder 103. The bladder 103 is adapted to encapsulate the nozzle 102. During operation of the device 100 the bladder 103 is adapted to be in contact with a user at an outer surface of the bladder 103, and receive fluid flow from the nozzle 102, at an inner surface of the bladder 103. The bladder 103 may be made of one or more of a flexible polymer material and a fabric material. Also, the flexible polymer material may be selected from a group consisting of Polyvinyl Chloride (PVC), Silicone, and Latex Further attached with the housing 101 is a storage container 104. The storage container 104 is adapted to store a fluid. The device 100 also includes a display unit 105 provided on the rear end of the device 100 and adapted to be facing the user. In that regard, the display unit 105 may be an LCD or LED based display unit with or without touch input capability. The input may also be provided through a keyboard. Further illustrated in FIG. 1A is a trigger element 107. The trigger element 107 acts as a switch allowing activation and deactivation of the fluidic massage, when pressed and released, respectively. To electronically modify fluid flow characteristics, such as speed, intensity, pulsating or continuous application, direction, and flow pattern, of the fluidic massage, the device 100 may also be provided with several push buttons 108 for receiving several inputs from the user. A base structure 110 allows the device 100 to be located upon a flat surface when device 100 is not being utilized.

Further illustrated in FIG. 1A are fluidic channels 112*a* and 112*b*. The fluidic channels 112*a* and 112*b* may be structured as cavities in the housing 101, or the cavities may be provided with tubular inserts acting as fluidic channels 112*a* and 112*b*. The fluidic channels 112*a* and 112*b* have respective first ends that are located within the storage container 104. Also, the respective second ends of the fluidic channels 112*a* and 112*b* are connected with the nozzle 102. In that regard, the fluidic channel 112*a* may act as a fluid supply channel, and the fluidic channel 112*b* may act as a suction channel or vice versa. In several embodiments of the present invention, the device 100 may include several more fluidic channels, in a manner that at least one of the fluidic channels is a supply channel and at least one of fluidic channels is a suction channel. FIG. 1A also illustrates radiation sources 105. In several embodiments of the present invention, the radiation sources 105 may include Light Emitting Diodes (LEDs).

The LEDs are characterized by their superior power efficiencies, smaller sizes, rapidity in switching, physical robustness, and longevity when compared with incandescent or fluorescent lamps. In that regard, the one or more LEDs may be through-hole type LEDs (generally used to produce electromagnetic radiations of red, green, yellow, blue and white colors), Surface Mount LEDs, Bi-color LEDs, Pulse Width Modulated RGB (Red-Green-Blue) LEDs, and high-power LEDs, etc.

Materials used in the one or more LEDs may vary from one embodiment to another depending upon the frequency of radiation required. Different frequencies can be obtained from LEDs made from pure or doped semiconductor materials. Commonly used semiconductor materials include nitrides of Silicon, Gallium, Aluminum, and Boron, and Zinc Selenide, etc. in pure form or doped with elements such as Aluminum and Indium, etc. For example, red and amber colors are produced from Aluminum Indium Gallium Phosphide (AlGaInP) based compositions, while blue, green, and cyan use Indium Gallium Nitride based compositions. White light may be produced by mixing red, green, and blue lights in equal proportions, while varying proportions may be used for generating a wider color gamut. White and other colored lightings may also be produced using phosphor coatings such as Yttrium Aluminum Garnet (YAG) in combination with a blue LED to generate white light and Magnesium doped potassium fluorosilicate in combination with blue LED to generate red light. Additionally, near Ultraviolet (UV) LEDs may be combined with europium-based phosphors to generate red and blue lights and copper and zinc doped zinc sulfide-based phosphor to generate green light.

In addition to conventional mineral-based LEDs, one or more LEDs may also be provided on an Organic LED (OLED) based flexible panel or an inorganic LED-based flexible panel. Such OLED panels may be generated by depositing organic semiconducting materials over Thin Film Transistor (TFT) based substrates. Further, discussion on generation of OLED panels can be found in Bardsley, J. N (2004), "*International OLED Technology Roadmap", IEEE Journal of Selected Topics in Quantum Electronics*, Vol. 10, No. 1, that is included herein in its entirety, by reference. An exemplary description of flexible inorganic light-emitting diode strips can be found in granted U.S. Pat. No. 7,476,557 B2, titled "Roll-to-roll fabricated light sheet and encapsulated semiconductor circuit devices", which is included herein in its entirety, by reference.

In several embodiments, the one or more LEDs may also be micro-LEDs described through U.S. Pat. Nos. 8,809,126 B2, 8,846,457 B2, 8,852,467 B2, 8,415,879 B2, 8,877,101 B2, 9,018,833 B2 and their respective family members, assigned to NthDegree Technologies Worldwide Inc., which are included herein by reference, in their entirety. The one or more LEDs, in that regard, may be provided as a printable composition of the micro-LEDs, printed on a substrate.

Figure 1B:
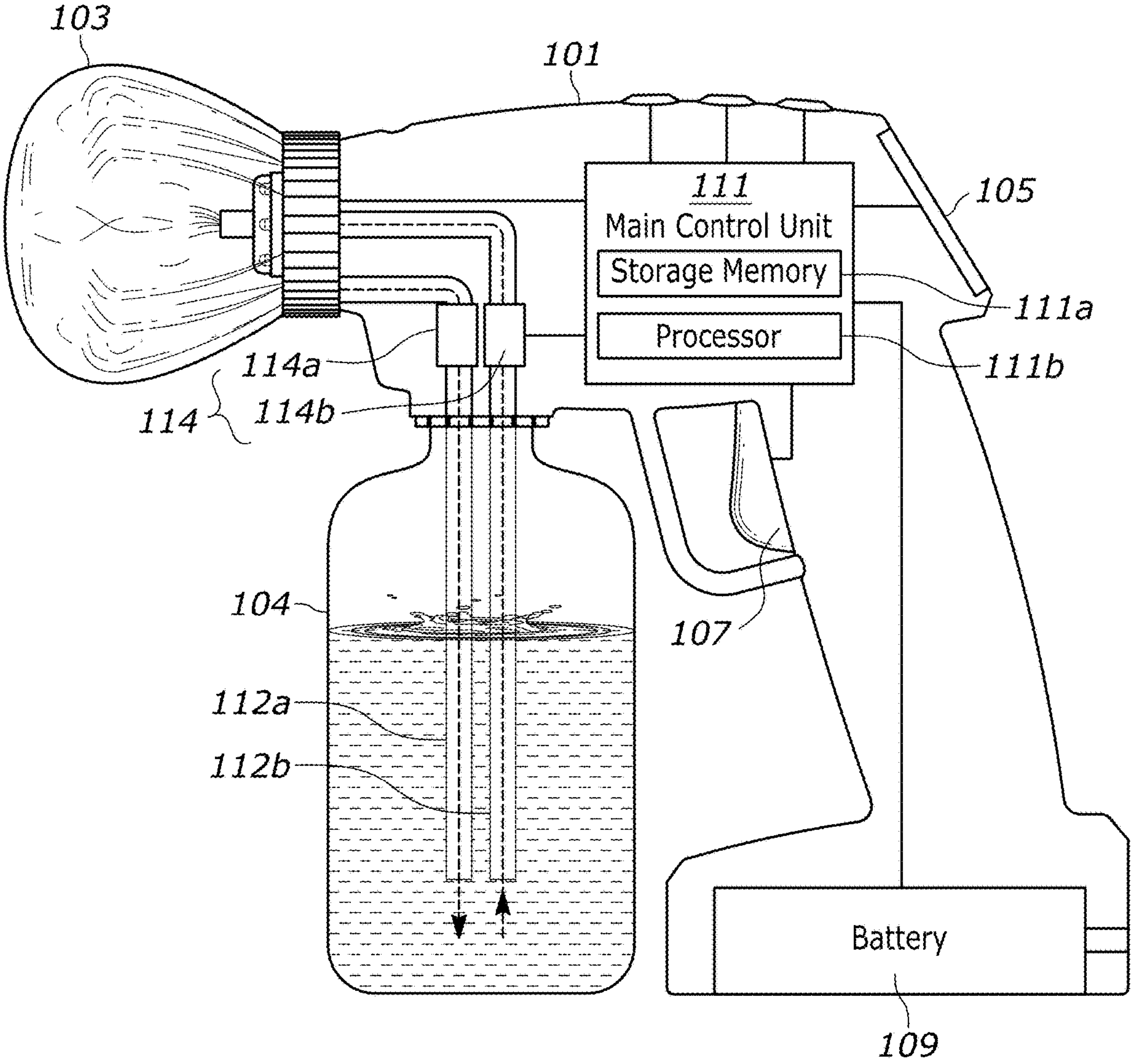
FIG. 1B illustrates a sectional view of the handheld device of FIG. 1A.

FIG. 1B illustrates a sectional view of the device 100 of FIG. 1A. FIG. 1B illustrates a pump 114. The pump 114 is in fluidic communication with the storage container 104 through the fluidic channels 112 *a* and 112 *b*. It is further illustrated that the pump 114 doubles as both a supply pump and a suction pump. Also, the fluidic channel 112 *a* acts as a suction channel and the fluidic channel 112 *b* acts as supply channel. However, in several embodiments of the invention, the device 100 may include more than one pumps. In such a configuration, at least one pump 114*a* may act as a supply pump and at least one pump 114*b* may act as a suction pump. FIG. 1B illustrates a main control unit 111 including a processor 111 *b* and a storage memory 111 *a*. The main control unit 111 is adapted to modify the flow characteristics of the fluid flow from the nozzle 102. The main control unit 111 may either act automatically based on machine-readable instructions stored in the storage memory 111 *a* and/or in response to inputs received through touch interface of the display unit 105 and/or the push buttons 108. A battery 109 has been provided within the housing 101 to power, inter alia, the pump 104 and the main control unit 111. In several alternate embodiments, the device 100 may operate through power derived from an AC or DC power supply.

Figure 2A:
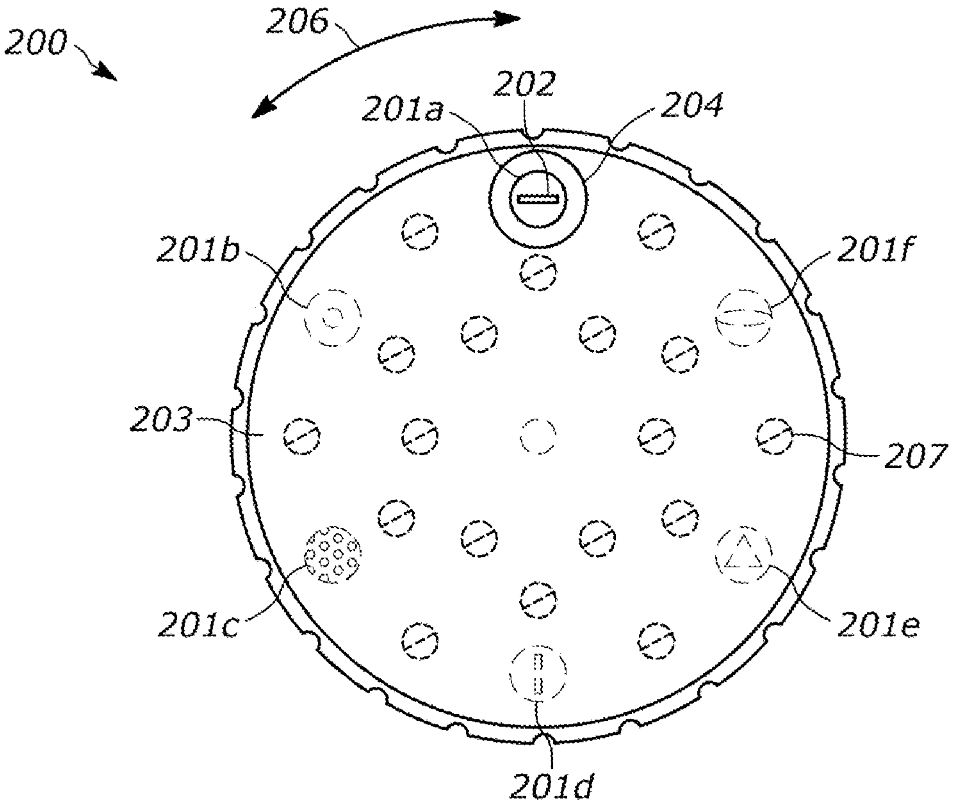
FIG. 2A illustrates several nozzles covered by a nozzle cap, in accordance with a second embodiment of the present invention.
Figure 2B:
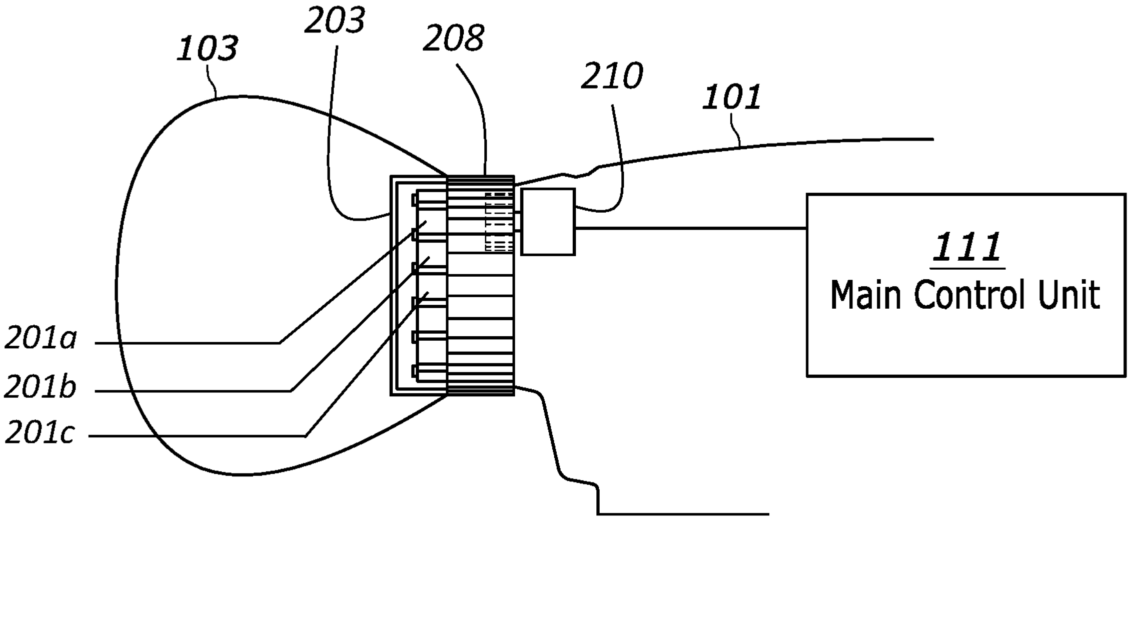
FIG. 2B illustrates a partial sectional view of the handheld device of FIG. 2A.

FIG. 2A illustrates several nozzles 201*a*, 201*b*, 201*c*, 201*d*, 201*e*, and 201*f* covered by a nozzle cap 203, in accordance with a second embodiment 200 of the present invention. The nozzle cap 203 is configured to modify the flow characteristic of the fluid flow from the nozzles 201*a*, 201*b*, 201*c*, 201*d*, 201*e*, and 201*f*. FIG. 2B illustrates a partial sectional view of the device 100 of FIG. 2A. It is further to be noted that the nozzle cap 203 is located over the nozzles 201*a*, 201*b*, 201*c*, 201*d*, 201*e*, and 201*f* and within the space encapsulated by the bladder 103. The nozzle cap 203 may include several through holes 204 of varying cross-sections, such as a rectangular cross-section 202 illustrated in FIG. 2. Other cross-sections such as circular, oval, and triangular are also illustrated in FIG. 2. The varying cross-section will cause the fluid flow impinging upon the inner surface of the bladder 103 to take several different flow patterns, as will be illustrated later in the specification.

The nozzle cap 203 may be adjusted 206 manually through rotation of the rotating element 208 with knurling provided on an external surface of the rotating element 208. The nozzle cap 203 may also be adjusted electronically through the main control unit 111 via an electrical motor 210 located within the housing 101, in accordance with the instructions stored in the storage memory 111*a* and/or inputs received through the display unit 105 and/or the push buttons 108. In several alternate embodiments, the main control unit 111 may be configured to modify the flow characteristics through electronic control of the one or more pumps 114. In that manner, the pumps 114 may be operated in several distinct modes such as pulsating and continuous or at varying speeds to modify the flow characteristics of the fluid flow. In several embodiments of the invention, the nozzle cap 203 may also double as an opaque or a diaphanous cover for a radiation source 207 illustrated in FIG. 2.

Figure 3:
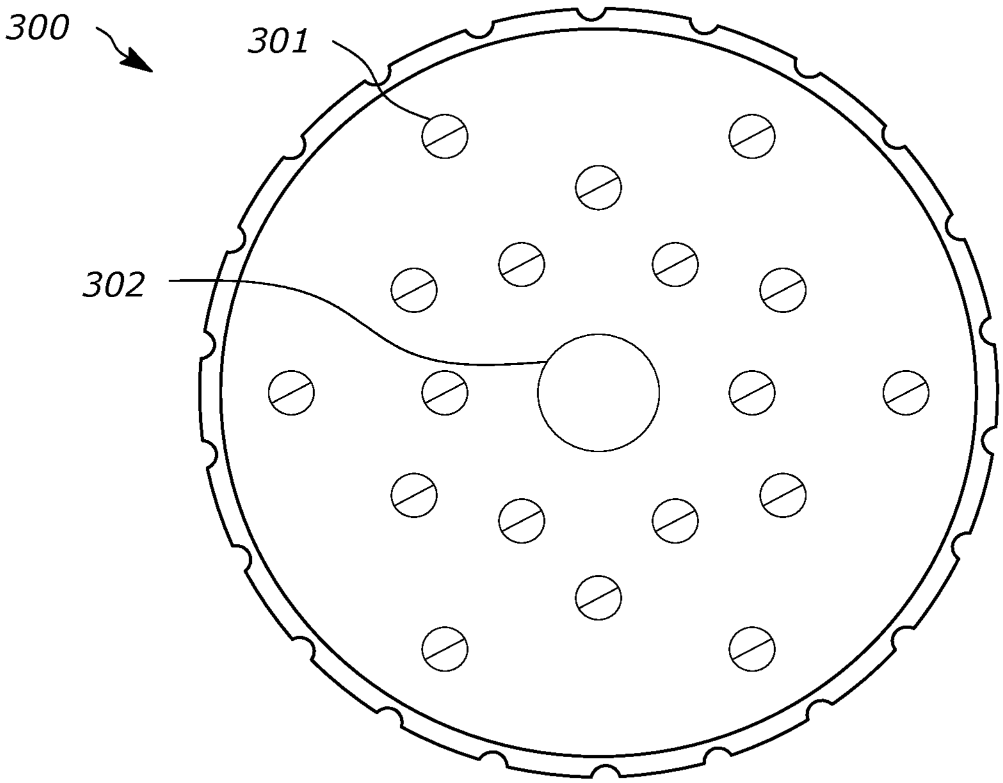
FIG. 3 illustrates a radiation plate, in accordance with a third embodiment of the present invention.
Figure 4:
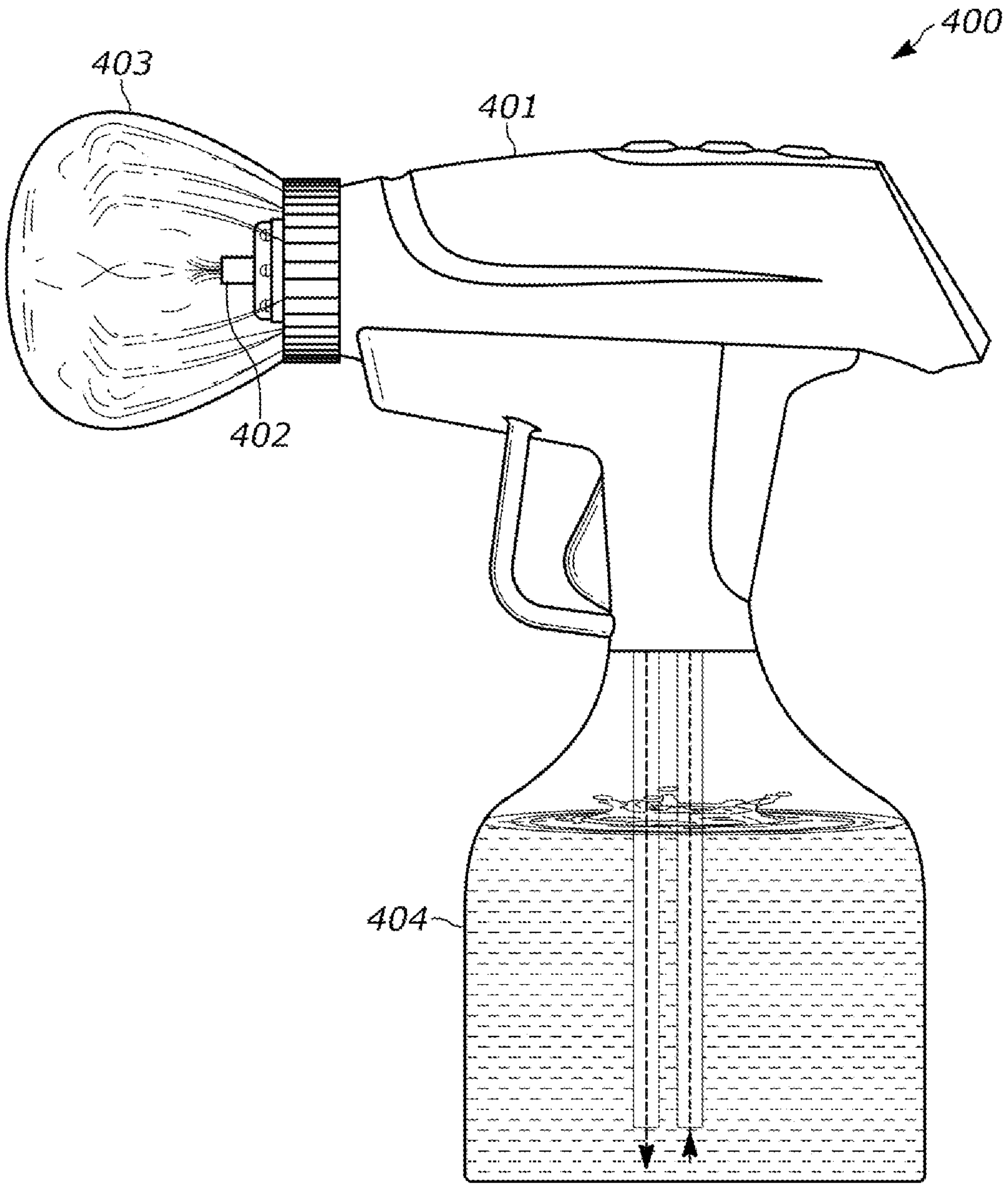
FIG. 4 illustrates the handheld device, in accordance with a fourth embodiment of the present invention.
Figure 5:
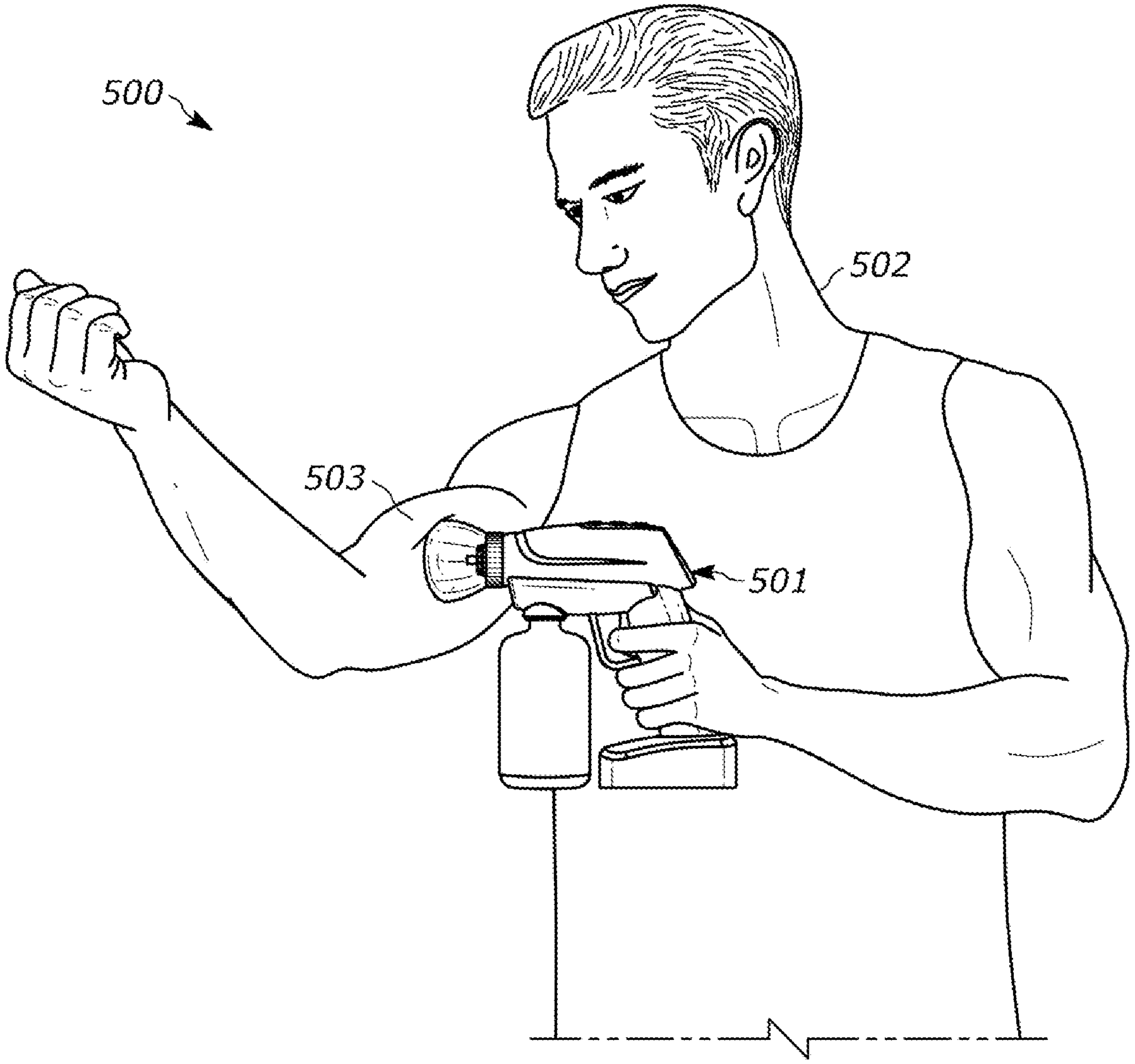
FIG. 5 illustrates a user applying fluidic massage through the handheld device, in accordance with an embodiment of the present invention.

FIG. 3 illustrates a radiation plate 300, in accordance with a third embodiment of the present invention. The radiation plate 300 is located within the space encapsulated by the bladder 103 and includes several radiation sources 301. Further, a nozzle 302 is located at the center of the radiation plate 300. The radiation sources 301 may be provided in several distinct patterns on the radiation plate 300 for emitting therapeutic electromagnetic radiation. FIG. 4 illustrates the device 100, in accordance with a fourth embodiment 400 of the present invention. The embodiment 400 illustrates the housing 401, the nozzle 402, the bladder 403, and the storage container 404 located in place of the base structure 110. FIG. 5 illustrates a user 502 applying a fluidic massage through the device 501 on biceps portion of their body, in accordance with an embodiment 500 of the present invention. The device 501 in that manner may be held in several different orientations for providing fluidic massage at several different portions of the body of the user 502.

Figure 6A:
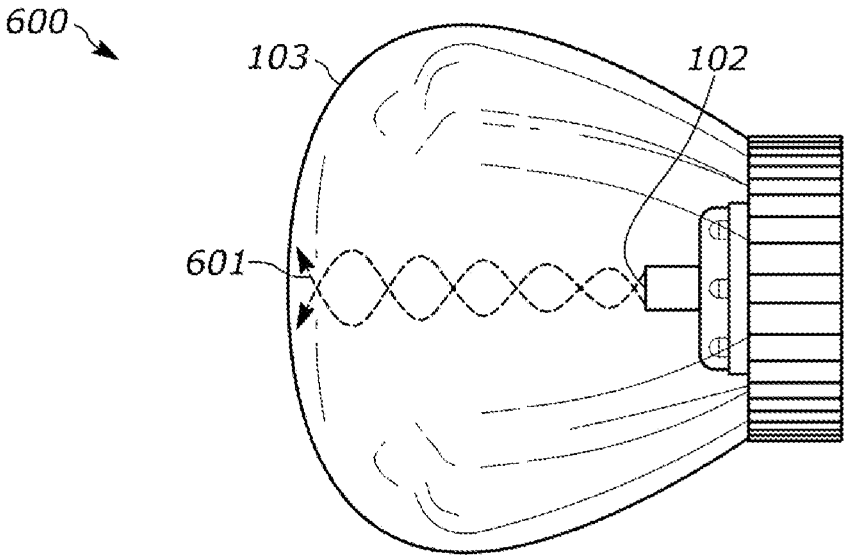
FIGS. 6A and 6B illustrates two distinct fluid flow patterns emanating from a nozzle, in accordance with an embodiment of the present invention.
Figure 6B:
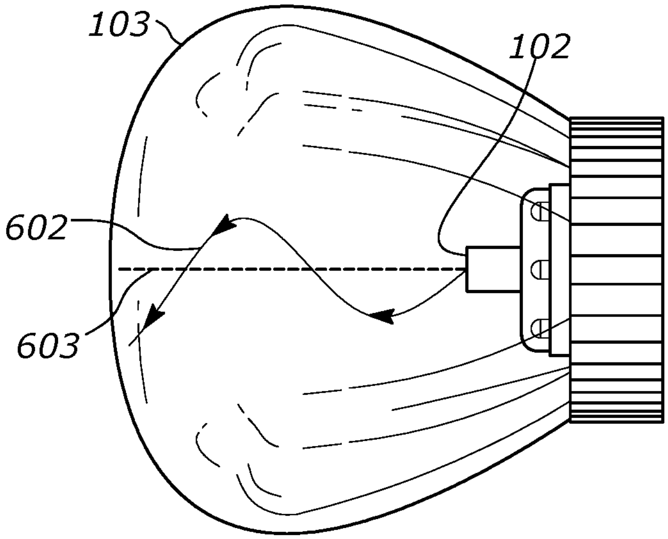
Figure 7:
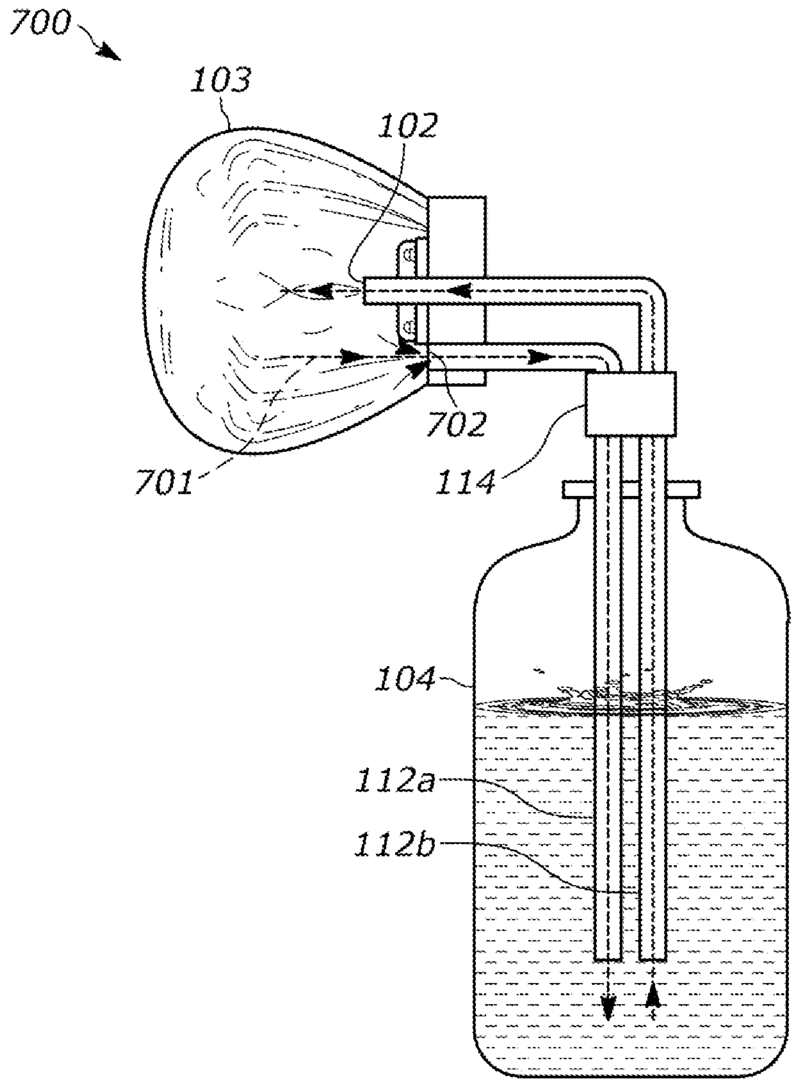
FIG. 7 illustrates a partial sectional view of the handheld device, in accordance with yet another embodiment of the present invention.

FIGS. 6A and 6B illustrates two distinct fluid flow patterns 601 and 602, emanating from the nozzle 102, in accordance with an embodiment 600 of the present invention. The distinct flow patterns include a double flow pattern 601 and a sinusoidal pattern 602 (about an axis 603) and may be achieved though combinations of adjustment 206 of the nozzle cap 203 and varying modes of operation and speeds of the pump 114. FIG. 7 illustrates a partial sectional view of the device 100, in accordance with yet another embodiment 700 of the present invention. In the embodiment 700, the pump 114 acts both as a supply pump and a suction pump and the fluid 701 is drawn into a suction port 702 provided at the second end of the fluidic channel 112*a*.

In use, the user 502 may bring the bladder 103 or 403 in contact with a portion of their body and apply pressure on the trigger element 107. The trigger element 107 would act as a switch thereby activating the main control unit 111 and the pump 114. The fluid will be supplied to the nozzle 102 though the fluidic channel 112*b*. The nozzle 102 would impinge the fluid onto the inner surface of the bladder 103 or 403 thereby providing fluidic massage to the user 502. The excess fluid in the bladder would be sucked through the suction port 702 and returned to the storage container 104 via the fluidic channel 112*a*. The flow characteristics of the fluid flow may be adjusted by the user 502 through touch interface of the display unit 105 or through the push buttons 108. Further, the user 502 may also manually rotate the nozzle cap 203 to change the fluid flow pattern and intensity etc.

Various modifications to these embodiments are apparent to those skilled in the art, from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claims.

The invention claimed is:

1. A handheld device for providing fluidic massage, the handheld device comprising:

a storage container adapted to store a fluid;

a plurality of fluidic channels extending into the storage container, each of the plurality of fluidic channels including a first end and a second end, wherein the first end is within the storage container, wherein at least one of the plurality of fluidic channels is a supply channel and at least one of the plurality of fluidic channels is a suction channel;

in fluidic communication with the storage container through the plurality of fluidic channels;

one or more nozzles provided at the second end of each of the plurality of fluidic channels; and a bladder encapsulating the one or more nozzles, wherein the bladder is adapted to be in contact with a user at an outer surface of the bladder, and receive fluid flow from the one or more nozzles, at an inner surface of the bladder;

wherein the one or more nozzles are configured to impinge fluid flow in one or more fluid patterns on an inner surface of the bladder to provide the fluidic massage to the user through the bladder, and the excess fluid in the bladder is sucked and returned to the storage container via one of the plurality of fluidic channel;

wherein the handheld device is configured to simultaneously supply fluid to the bladder through the supply channel and suck fluid from the bladder through the suction channel to provide continuous fluid recirculation during the fluidic massage.

2. The handheld device as claimed in claim 1, further comprising a nozzle cap configured to modify flow characteristics of the fluid flow from the one or more nozzles.

3. The handheld device as claimed in claim 2, wherein the nozzle cap includes one or more through holes, each of the one or more through holes has a varying cross-sections, wherein the flow characteristic of the one or more nozzle cap is modified by adjusting the nozzle cap to transition from a first through hole to a second through hole.

4. The handheld device as claimed in claim 2, wherein the nozzle cap is configured to be adjusted manually.

5. The handheld device as claimed in claim 2, wherein the nozzle cap is configured to be controlled electronically.

6. The handheld device as claimed in claim 1, wherein at least one pump performs the function of a supply pump and a suction pump.

7. The handheld device as claimed in claim 1, further comprising a radiation plate within a space encapsulated by the bladder, the radiation plate including one or more radiation sources for emitting electromagnetic radiation.

8. The handheld device as claimed in claim 7, wherein the one or more radiation sources includes one or more light emitting diodes for emitting therapeutic electromagnetic radiation.

9. The handheld device as claimed in claim 1, further comprising a main control unit adapted to modify flow characteristics of the fluid flow from the one or more nozzles.

10. The handheld device as claimed in claim 9, wherein the main control unit is configured to modify the flow characteristics through electronic adjustment of a nozzle cap.

11. The handheld device as claimed in claim 9, wherein the main control unit is configured to modify the flow characteristics through electronic control of the at least one pump.

12. The handheld device as claimed in claim 1, wherein the bladder is made of one or more of a flexible polymer material and a fabric material.

13. The handheld device as claimed in claim 12, wherein the flexible polymer material is selected from a group consisting of Polyvinyl Chloride (PVC), Silicone and Latex.

14. The handheld device as claimed in claim 1, wherein the device comprises a plurality of pumps, at least one of the plurality of pumps is a supply pump and at least one of the plurality of pumps is a suction pump.

15. A handheld device for providing fluidic massage, the handheld device comprising:

a storage container adapted to store a fluid;

a plurality of fluidic channels extending into the storage container, each of the plurality of fluidic channels including a first end and a second end, wherein the first end is within the storage container, wherein at least one of the plurality of fluidic channels is a supply channel and at least one of the plurality of fluidic channels is a suction channel; at least one pump in fluidic communication with the storage container through the plurality of fluidic channels;

one or more nozzles provided at the second ends of each of the plurality of fluidic channels; and a bladder encapsulating the one or more nozzles, wherein the bladder is adapted to be in contact with a user at an outer surface of the bladder, and receive fluid flow from the one or more nozzles, at an inner surface of the bladder;

wherein the one or more nozzles are configured to impinge fluid flow in one or more fluid patterns on an inner surface of the bladder to provide the fluidic massage to the user through the bladder, and the excess fluid in the bladder is sucked and returned to the storage container via one of the plurality of fluidic channel;

wherein the handheld device is configured to simultaneously supply fluid to the bladder through the supply channel and suck fluid from the bladder through the suction channel to provide continuous fluid recirculation during the fluidic massage;

a radiation plate within a space encapsulated by the bladder, the radiation plate comprises a radiation source for emitting therapeutic electromagnetic radiation.

* * * * *